United States Patent Office 2,919,261
Patented Dec. 29, 1959

2,919,261
REACTION PRODUCTS OF ESTERS OF BETA-KETO ACIDS AND CARBONYL COMPOUNDS

Roger M. Christenson, Whitefish Bay, and Lowell O. Cummings, Milwaukee, Wis., assignors to Pittsburgh Plate Glass Company, Allegheny County, Pa.

No Drawing. Application May 21, 1954
Serial No. 431,578

2 Claims. (Cl. 260—45.4)

This invention relates to a novel reaction product of an aldehyde and an ester of beta-keto acid and to a method of preparing the same. It has particular relation to a reaction product of formaldehyde, or a formaldehyde yielding substance such as paraformaldehyde, and an ester of acetoacetic acid, and an alcohol containing a terminal ethylenic group, and to the valuable products derived therefrom.

It has heretofore been suggested to react formaldehyde with an ester of acetoacetic acid, such as ethyl acetoacetate to form cyclic condensation products of little, or no, recognized utility.

This invention is based upon the discovery of valuable reaction products of aldehydes, such as formaldehyde, or substances decomposing to react as formaldehyde, and esters of beta-keto acids, and alcohols containing terminal ethylenic groups.

The invention involves a further discovery that esters of beta-keto acids such as acetoacetic acid, and alcohols such as allyl alcohol, containing terminal ethylenic groups can be reacted or condensed with a formaldehyde yielding substance such as paraformaldehyde, even in the absence of catalysts, to form products which are capable of vinylic polymerization. They form valuable homopolymers and are useful for modifying various vinylic monomers, or mixtures of such monomers, with polyesters of alpha-beta ethylenic dicarboxylic acids, to impart good plasticity and high extensibility to the products of modification. Moreover, they do not substantially modify the curing properties or the color of such products.

The products of reaction of the aldehydes and the ester of the beta-keto acid are also useful plasticizers of cellulosic esters, such as cellulose acetate, which are recognized to be difficult to plasticize and for which there are relatively few known effective compounds. When employed in the latter capacity, the novel reaction products of aldehydes and esters of beta-keto acids and ethylenically unsaturated alcohols, impart a high degree of plasticity to the cellulosic esters and because of their high boiling points, are relatively permanent in their plasticizing action.

The reactions involved between the aldehyde and the ester of a beta-keto acid and an alcohol containing a terminal $>C=CH_2$ group, may be represented by the following equations:

(1) $CH_3COCH_2CO_2R + R'\text{—}CHO \longrightarrow$ 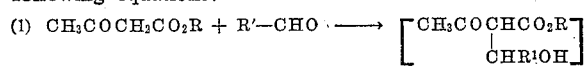

(2) 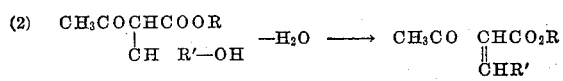

In the equations, the group R is the radical or residue from the esterification reaction between the beta-keto acid and the alcohol containing a terminal ethylenic group. The group R' is the radical of the aldehyde and in the instance of formaldehyde, or paraformaldehyde, is H.

Apparently, the ethylenic group resulting from the splitting off of water from the aldehyde residue, in Equations 1 and 2 is capable of reaction to form dimers and polymers in accordance with the equations:

(3) 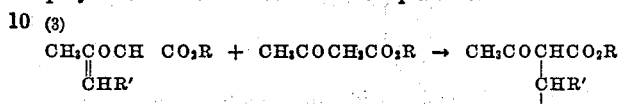

(4) 

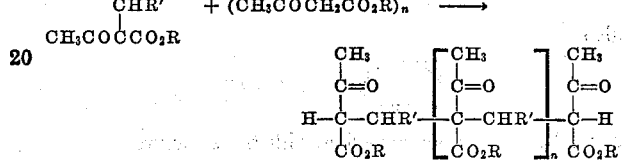

The groups R and R' have the same significance as in Equations 1 and 2.

It will also be recognized that the beta-keto groups in the foregoing equations are apparently tautomeric with the enolic form in accordance with the equation:

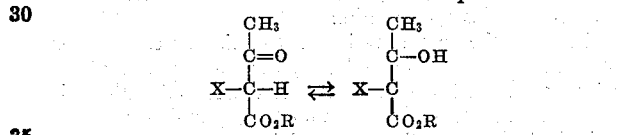

In the equation, group R is terminal ethylenic $$(>C=CH_2)$$

X may be H, or it may be a polymeric unit as in Equation 4 preceding.

A methylol group and a methylene hydrogen may lose water intermolecularly to give the same bonds.

Two methylol groups can also split off water to form an ether linkage —$CH_2$—O—$CH_2$—, which contributes to polymer structure.

The above equations and statements represent plausible explanations, but other mechanisms may be equally plausible. These explanations should not be construed as restricting the scope of the invention or limiting it to certain reaction mechanisms.

The group R in the above equations, by reason of the terminal ethylenic ($>C=CH_2$) groups, are assumed to be capable of addition with themselves, or with monomers of various types, or they can add to the ethylenic groups in alpha-beta ethylenic, alpha-beta dicarboxylic acid polyesters, such as the polyesters of propylene glycol and maleic or fumaric acid.

In the practice of this invention, various alcohols containing ethylenic groups and the organic radicals of which are designed to provide ethylenically unsaturated groups R in the foregoing equations may be employed. They comprise allyl alcohol, methallyl alcohol, allylethyl alcohol, ethylvinylcarbinol, allylcarbinol, and others.

While acetoacetic acid esters of ethylenically unsaturated alcohols have been particularly emphasized in the foregoing equations, it will be apparent that the acetoacetic acid may be replaced by other beta-keto acids. The following constitutes a representative list of beta-keto acids:

Acetoacetic acid
Alpha ethyl acetoacetic acid
Alpha isopropyl acetoacetic acid
Alpha methyl acetoacetic acid
Benzoyl acetoacetic acid
Acetone dicarboxylic acid
Gamma chloro acetoacetic acid
Alpha benzoyl acetoacetic acid
Alpha phenyl acetoacetic acid
Chloro iodo and bromo substitution products of the above acids
Acetylsuccinic acid
Benzoyl acetic acid
Diester of

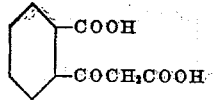

All of the foregoing acids contain a beta-keto carbonyl group. They also contain at least one, and preferably two, active hydrogens on the alpha carbon atom.

Malonic acid esters are also included as are

also

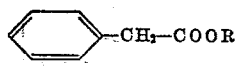

as well as any other materials with the structure

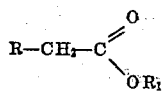

where R is a strong negative group as illustrated above and $R_1$ contains unsaturation.

Esters of the foregoing beta-keto acids or compounds containing activated methylene groups and the ethylenically unsaturated alcohols, may be condensed with various aldehydes of which formaldehyde yielding paraformaldehyde is presently preferred because of its general availability and economy and because of its overall reactivity and efficiency. However, other aldehydes notably unsaturated aldehydes such as acrolein, furfural, and crotonaldehyde may also be caused to undergo reaction with the esters of the beta-keto acids to form valuable products. Formalin (a solution of formaldehyde in water) per se may be used but has been found to be much less efficient than paraformaldehyde.

Methods of forming esters of alcohols containing terminal $>C=CH_2$ groups and beta-keto acids, such as acetoacetic acid, are deemed to be secondary to the present invention, since any of the esters may be reacted with aldehydes, such as formaldehyde, or formaldehyde yielding substances such as paraformaldehyde. Methods of preparing such esters are described in a copending application Serial Number 219,900, filed April 7, 1951, Patent No. 2,693,484. Probably the most satisfactory method is to effect ester interchange between an ester of the desired beta-keto acid such as acetoacetic acid and a lower, volatile alcohol such as methyl or ethyl alcohol. The reaction can be effected by heating to a moderate temperature, e.g. to about 50° C. to 160° C., a mixture of methyl or ethyl ester of a beta-keto acid and the unsaturated alcohol, preferably under such conditions as to eliminate the evolved lower alcohol such as methyl or ethyl alcohol. An equivalency, or an excess of the unsaturated alcohol may be used; but it is often desirable to employ a substantial excess of the ester of the lower alcohol and the beta-keto acid, for example, 2 to 100 moles excess. In this way it is possible so to dilute the evolved alcohol as to promote the progress of the reaction in the desired direction.

The esters of beta-keto acids and alcohols containing terminal ethylenic groups may be reacted with the aldehyde or aldehyde forming component with or without catalysts of reaction. However, in most instances, it is preferred to operate in the absence of catalyst since it has been found that the latter agents do not appreciably speed up the reaction and may lead to complications.

The reaction between the aldehyde and the beta-keto acid ester can be conducted under vacuum for purposes of removing as much as practicable of the water of reaction as it is formed in accordance with the equations previously given. As in the reaction of ester interchange, other methods of promoting the removal of water may also be resorted to. For example, a solvent such as toluene adapted to remove water by azeotropic distillation may be included. Still another method of eliminating evolved water comprises subjecting the reaction mixture of aldehyde and ester, at reaction temperatures, to blowing with an inert gas such as carbon dioxide or nitrogen designed to sweep out evolved water. Combinations of these methods may be employed.

The preparation of esters of beta-keto acids and alcohols containing reactive terminal double bonds and being adapted for reactions with various aldehydes including formaldehyde or paraformaldehyde in accordance with the provisions of the present invention, will be illustrated by the examples hereinafter to follow.

While the examples illustrating the preparation of beta-keto esters are directed more particularly to reactions of ester interchange between methyl acetoacetate and allyl alcohol, it will be appreciated that essentially the same procedures and apparatus are applicable to the preparation of any of the esters of the various beta-keto acids and alcohols containing terminal ethylenic groups. For example, the methods may be applied to the preparation of allyl alpha ethyl acetoacetate, allyl alpha isopropyl acetoacetate, allyl alpha methyl acetoacetate, allyl benzoyl acetoacetate, allyl acetone dicarboxylic acid ester, allyl gamma chloro acetoacetate, allyl alpha benzoyl acetoacetate, allyl alpha phenyl acetoacetate, allyl acetylsuccinic acetate, and others.

Examples of esters containing other unsaturated alcohols than allyl alcohol include methallyl acetoacetate, ethyl vinyl acetoacetate, and others. Obviously the alcohols containing terminal ethylenic groups can be reacted by ester interchange with methyl or ethyl esters of any of the beta-keto acids previously mentioned. The resultant esters containing terminal ethylenic ($>C=CH_2$) groups can be condensed with aldehyde substances and notably with paraformaldehyde.

The following examples illustrate the preparation of esters suitable for subsequent reaction with aldehydes in accordance with the provisions of this invention:

*Example A*

The reaction mixture comprised:

Methyl acetoacetate _____ 1000 grams (8.6 moles).
Allyl alcohol _____ 1500 grams (26.8 moles).

A catalyst was not employed. The mixture was refluxed in a flask under a 15 inch Widmer column and the methanol liberated by the reaction was collected as a mixture of methanol and allyl alcohol comprising about 16 to 22 percent methanol. The reaction was continued until 215 grams of methanol had been collected and it was deemed that the reaction was substantially complete. The allyl alcohol was stripped from the reaction at a pressure of 20 millimeters of mercury (absolute). A yield of 944 grams of allyl acetoacetate having a refractive index at 25° C. of 1.43514, was obtained. This product was water white in color and was suitable for reaction with aldehyde, or aldehyde yielding substances such as paraformaldehyde.

Example B

Replace the allyl alcohol, in Example A, with allyl-carbinol and proceed as in the former example.

Example C

Replace the allyl alcohol of Example A, with methyl vinyl carbinol and proceed in the same manner as in Example A. The product is the methyl vinyl carbinol ester of acetoacetic acid.

Example D

Replace the methyl acetoacetate of Example A with the methyl acetylsuccinic acid and replace the allyl alcohol with allyl carbinol to obtain the allyl carbinol ester of acetylsuccinic acid.

In each of the foregoing reactions it will be apparent that the removal of low boiling alcohol evolved by the ester interchange reaction promotes the progress of the reaction in the desired direction.

The following examples illustrate the reaction of esters of beta-keto acids and alcohols containing terminal ethylenic groups with an aldehyde yielding substance.

Example I

In this example, paraformaldehyde was employed as an aldehyde yielding substance. The reaction equipment comprised a glass flask equipped with a stirrer and a reflux condenser. Toluene was employed as a reaction medium and allyl acetoacetate prepared as in Example A constituted the beta-keto ester.

The reaction charge comprised:

Allyl acetoacetate _____ 600 grams (4.2 moles).
Paraformaldehyde _____ 125 grams (4.15 moles).
Toluene _____ 400 milliliters.

The ester was added dropwise to the suspension of paraformaldehyde in the toluene while the mixture was stirred and heated on the steam bath. This required 1 hour. The condenser was changed to distilling position and was connected to a vacuum pump. The mixture was heated to 50° C. to 60° C. under vacuum of 70 to 80 millimeters of mercury (absolute) and the reaction was conducted with removal of water of reaction and toluene. The reaction was continued for one hour, or until water ceased to evolve. A yield of 690 grams of a product of a Gardner viscosity of Z was obtained. This product, when filtered, was very nearly water white, though a large bulk thereof exhibited a slightly yellow tinge.

This product could be mixed with a free radical initiator type catalyst such as benzoyl peroxide, t-butyl hydroperoxide, cumene hydroperoxide, alpha, alpha azodiisobutyronitrile etc., and polymerized by heating. It could also be mixed with cellulose acetate as a plasticizer. Likewise, it could be interpolymerized with styrene or with mixtures of styrene and polyesters of alpha-beta ethylenically unsaturated dicarboxylic acids.

Example II

In accordance with this example, a mixture of methyl acetoacetate and allyl acetoacetate were reacted conjointly with paraformaldehyde to provide a mixed product of valuable properties. The reaction comprised:

Methyl acetoacetate (distilled) ___ 232 grams (2 moles).
Allyl acetoacetate _____ 284 grams (2 moles).
Paraformaldehyde (commercial) __ 120 grams (4 moles).
Toluene _____ 200 milliliters.

In the reaction, the toluene and paraformaldehyde were agitated to form a slurry in reaction equipment similar to that described in Example I. The mixture of methyl acetoacetate and allyl acetoacetate was then slowly dripped into the slurry. At the conclusion of the dripping operation, the paraformaldehyde dissolved and the mixture was filtered through a very fine paper. The mixture was reacted under vacuum from a water pump for 4 hours until a clear product of a viscosity of Z was obtained.

This product could be polymerized, preferably in the presence of a free radical initiator type catalyst to form a homopolymer. Also it could be interpolymerized with compounds containing >C=CH$_2$ groups attached to a negative radical and being represented by styrene or by alpha methylstyrene or a similar compound mixed with a polyester of an alpha-beta ethylenic dicarboxylic acid.

It will be appreciated that the esters of beta-keto acids or malonic acids and alcohols containing terminal ethylenic groups as disclosed in any of the Examples B, C, and D, or similar esters can be employed in lieu of the allyl acetoacetate of Example I, to provide useful products. It will also be appreciated that the paraformaldehyde of Examples I and II may be replaced by furfural, acrolein or crotonaldehyde, or the like unsaturated aldehydes, to provide useful products under the provisions of this invention.

Example III

In this example, methyl acetoacetate was condensed with acrolein to provide a product of the presumed formula:

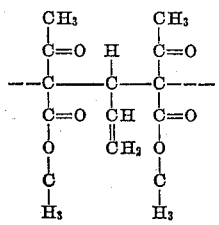

In the reaction, water was split off.
The reaction charge comprised:

| | Grams |
|---|---|
| Methyl acetoacetate | 464 |
| Acrolein | 224 |
| Zinc chloride (catalyst) | 8 |
| Toluene | 225 |

The toluene, acrolein, and zinc chloride were stirred in a three-necked flask fitted with a thermometer, a stirrer, and a water cooled condensor. The methyl acetoacetate was slowly dripped into the mixture by means of a separatory funnel. The mixture was refluxed by the heat of reaction at about 70° C. during the entire addition of the methyl acetoacetate. When the addition of methyl acetoacetate was complete, an azeotropic separator was coupled to the condensor and the water of reaction was distilled off and removed. Reaction was continued until 50 milliliters of water was removed. The reaction mixture turned a dark yellow, whereupon 40 grams of decolorizing carbon was added and the reaction mixture was stripped at a pressure of 10 to 12 millimeters of mercury (absolute) upon a steam bath. Ultimately the reaction product was distilled under a reaction pressure of 10 millimeters of mercury (absolute) to provide a light yellow syrup and a dark brown residue. The syrup distilled at a temperature of 130 to 180° C.

Example IV

This example involves a repetition of Example III, but with furfural instead of acrolein. When the mixture was heated to evolve water the product distilling in a range of 70° C. to 150° C. under a pressure of 5 millimeters of mercury (absolute) was obtained.

While the reaction or condensation of paraformaldehyde or aldehydes containing ethylenic groups, with esters of aceto acids and alcohols containing terminal ethylenic groups has been particularly emphasized, it is to be appreciated that paraformaldehyde can advantageously be reacted with esters of beta-keto acids such as acetoacetic acid and saturated alcohols such as methyl or ethyl alcohols. Preferably the reaction of paraformaldehyde and the ester of acetoacetic acid and the saturated alcohol is conducted in the presence of an appropriate medium such as an aromatic hydrocarbon represented by toluene or xylene. As a result of the reaction between paraformaldehyde and the ester, products of high molecular weight which are also soluble in a great many organic materials are obtained. These products contain a high percentage of ketone and ester groups which enhance their compatibility with cellulose esters and other organic plastics.

The reaction of paraformaldehyde with methyl acetoacetate is represented by the following example:

*Example V*

In the reaction one mole (400 grams) of parformaldehyde was suspended in 1000 milliliters of toluene. The mixture was stirred in a glass flask equipped with a reflux condenser and a dropping funnel. The mixture was heated on a steam bath and 1600 grams of methyl acetoacetate was added dropwise over a period of about 1.5 hours. After the ester was all incorporated, the mixture was filtered through a Celite filter bed to remove haze. The toluene and water of reaction were then stripped off under a pressure of 70 to 100 millimeters of mercury (absolute), while the mixture was blown with inert gas (carbon dioxide) on a steam bath. Stripping was continued for 4 or 5 hours and a yield of 1838 grams of a clear to slightly hazy, very pale yellow oil of a viscosity greater than $Z_6$ was obtained. This product did not contain the terminal ethylenic group in the ester portion but it still was valuable for use as a plasticizer and such like applications.

*Example VI*

In this example, the monomethyl ether of ethylene glycol was employed as the higher alcohol component in the ester interchange reaction with methyl acetoacetate. In the reaction, 1000 grams of monomethyl ether of ethylene glycol and 400 grams of methyl acetoacetate were heated overnight on steam bath and under slightly reduced pressure accompanied by a slow stream of inert gas.

After the evolved methanol and the excess of monomethyl ether of ethylene glycol had been distilled under vacuum, the resultant ester of acetoacetic acid and monomethyl ether of ethylene glycol could be reacted with paraformaldehyde suspended in toluene to evolve water and to provide a condensation product in accordance with the provisions of the present invention. The product could be employed as a plasticizer for synthetic plastics.

Applications of these products are illustrated by the following examples:

*Example 1*

In this example a condensation product of allyl acetoacetate and paraformaldehyde was mixed with 1 percent of benzoyl peroxide and the mixture was heated on a steam bath. Heating was continued for different samples over periods varying from 2 to 16 hours. The product was a light brown solid which was clear, though somewhat soft.

*Example 2*

In accordance with this example equal parts by weight of allyl acetoacetate, prepared as previously described, and styrene were mixed with 1 percent by weight of benzoyl peroxide and the mixture was heated on a steam bath for 16 hours to provide a very pale brown but highly transparent plastic material which was hard to the touch and could be employed as a coating upon the surfaces of wood, metal, and the like. The sample was readily soluble in such media as methyl ethyl ketone. It was also fairly soluble in xylene. A film of the material deposited from methyl ethyl ketone solution, upon a glass panel, dried to a film which could be scratched by the fingernail with difficulty. The film when baked was hard and clear, thus demonstrating the utility of the material as a coating medium. Styrene could be replaced by other liquid polymerizable monomers containing a $>C=CH_2$ group attached to a negative radical. Examples are vinyl chloride, vinyl acetate, acrylic acid and others.

*Example 3*

In accordance with this example, a condensation product of paraformaldehyde and allyl acetoacetate was employed as a modifier in a copolymerizable mixture about 33 percent styrene and a polyester which was a product of esterification of propylene glycol and maleic anhydride. The copolymerizable mixture was employed in an amount of 80 parts by weight and to this was added 20 parts by weight of allyl acetoacetate-formaldehyde condensation product. The mixture was catalyzed with 0.4 percent by weight of tertiary butyl hydroperoxide. It was then introduced into cells comprising glass plates spaced ⅛ inch apart. The samples were cured at 170° F. for one hour and ultimately were baked at 250° F. for another hour. The resultant sheets when removed from the cells were hard, flexible and tough. The flexibility was substantially greater than that of a control sample prepared from the these same polyester-styrene components and the same catalyst, but without the addition of the allyl acetoacetate-formaldehyde condensation product.

*Example 4*

In this example, a condensation product of methyl acetoacetate and paraformaldehyde, prepared by the method previously described, was employed to plasticize cellulose acetate. A series of solutions of the cellulose acetate were made up of the following compositions:

| | | | |
|---|---|---|---|
| Cellulose acetate_____grams__ | 10 | 7.5 | 5 |
| Methyl acetoacetate formaldehyde condensate grams | 0 | 2.5 | 5 |
| Acetone_____do____ | 40 | 40 | 40 |

The solutions were coated on glass panels and dried. All films were perfectly clear and the softness was in proportion to the amount of the methyl acetoacetate-formaldehyde condensation product contained therein.

A second set of similar solutions were prepared; but dimethyl phthalate was employed as the plasticizer in lieu of the methyl acetoacetate-paraformaldehyde condensate. This series of samples was somewhat softer than the first mentioned series. These tests indicate the compatibility of the condensation product with cellulose acetate and also show that the latter is a valuable plasticizer for this relatively difficultly plasticizable material and has the advantage of being non-volatile.

*Example 5*

An allyl acetoacetate-formaldehyde condensate prepared as in Example I was mixed with styrene, a free radical catalyst (benzoyl peroxide) and a polyester of the composition: maleic anhydride 1 mole, adipic anhydride 6 moles, and diethylene glycol 7.18 moles. The mixture comprised:

Parts by weight
Allyl acetoacetate-formaldehyde condensate _____ 5
Polyester _____ 5
Styrene _____ 10
Benzoyl peroxide solution (equal parts by weight in styrene) _____ 1

The mixture was cast and cured for 1 hour at 170° F. and then at 250° F. for 1 hour to provide sheets of 20 mils thickness. These sheets were of an extensibility and flexibility about equal to that of polyvinylbutyral resins used in safety glass. The resins were strong and tough, and the strength of notched samples was good. The resins could be used in safety glass, either as pre-cured sheets or as reinforcing layers cured in situ between the plates of glass.

We claim:

1. As a new resin product, an interpolymer formed by heating in the presence of a peroxide catalyst of polymerization a mixture of: (A) a polyester of an alpha-beta ethylenic dicarboxylic acid and a glycol (B) styrene, and (C) a condensate of formaldehyde and an ester of a beta-keto acid containing an alpha hydrogen atom and an aliphatic alcohol containing a straight chain of 3 to 4 carbon atoms with a terminal ethylenic group in said chain.

2. As a new resin, the addition polymerizate obtained by heating a mixture consisting essentially of a peroxide catalyst and a material of a class consisting of the condensate of formaldehyde and an ester of acetoacetic acid and an alcohol of a class consisting of allyl alcohol and methallyl alcohol and mixtures of said condensate with styrene.

References Cited in the file of this patent

UNITED STATES PATENTS

| | | |
|---|---|---|
| 2,325,376 | D'Alelio | July 27, 1943 |
| 2,480,810 | Jones | Aug. 30, 1949 |
| 2,488,883 | Shokal et al. | Nov. 22, 1949 |